United States Patent
Baba et al.

(10) Patent No.: US 9,343,926 B2
(45) Date of Patent: May 17, 2016

(54) POWER CONTROLLER

(75) Inventors: Akira Baba, Osaka (JP); Kiyotaka Takehara, Nara (JP); Takeshi Ogawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 531 days.

(21) Appl. No.: 13/995,582

(22) PCT Filed: Dec. 28, 2011

(86) PCT No.: PCT/JP2011/080460
§ 371 (c)(1),
(2), (4) Date: Jun. 19, 2013

(87) PCT Pub. No.: WO2012/091113
PCT Pub. Date: Jul. 5, 2012

(65) Prior Publication Data
US 2013/0270911 A1    Oct. 17, 2013

(30) Foreign Application Priority Data

Dec. 28, 2010 (JP) ................................. 2010-293468
Jun. 22, 2011 (JP) ................................. 2011-138519

(51) Int. Cl.
*H02J 1/00* (2006.01)
*H02J 9/06* (2006.01)
(Continued)

(52) U.S. Cl.
CPC . *H02J 9/062* (2013.01); *H02J 7/34* (2013.01); *H02J 3/383* (2013.01); *Y02E 10/563* (2013.01); *Y10T 307/62* (2015.04)

(58) Field of Classification Search
CPC .......... H02J 9/062; H02J 7/34; Y10T 307/62
See application file for complete search history.

(56) References Cited

U.S. PATENT DOCUMENTS

2003/0047209 A1* 3/2003 Yanai ..................... H02J 3/32
136/244
2006/0276938 A1* 12/2006 Miller .................... G06Q 50/06
700/295
(Continued)

FOREIGN PATENT DOCUMENTS

JP    2002-269406 A    9/2002
JP    2002-369406 A    12/2002
(Continued)

OTHER PUBLICATIONS

International Search Report for corresponding International Application No. PCT/JP2011/080460 mailed Apr. 3, 2013.
(Continued)

*Primary Examiner* — Daniel Cavallari
(74) *Attorney, Agent, or Firm* — Renner, Otto, Boisselle & Sklar, LLP

(57) ABSTRACT

Residential system includes photovoltaic power system including solar battery, and electrical storage device including battery. Electric load of residential system is selectively supplied with energy from power supply system, power generator and electrical storage device. Power generator allows energy to flow back to power supply system. Energy surplus judgment part calculates difference between generating energy of power generator and demand power for electric load (excess generating energy). Overall operation controller applies stored energy in electrical storage device to demand energy for electric load when excess generating energy is produced, and charges electrical storage device without applying generating energy of power generator to demand energy when excess generating energy is not produced.

13 Claims, 9 Drawing Sheets

(51) Int. Cl.
*H02J 7/34* (2006.01)
*H02J 3/38* (2006.01)

(56) References Cited

U.S. PATENT DOCUMENTS

| | | | | |
|---|---|---|---|---|
| 2010/0076615 A1* | 3/2010 | Daniel | ............... | F03D 9/00 |
| | | | | 700/293 |
| 2011/0109165 A1* | 5/2011 | Hahn | ............... | H02J 3/28 |
| | | | | 307/72 |
| 2011/0140667 A1* | 6/2011 | Moon | ............... | H02J 3/32 |
| | | | | 320/134 |

FOREIGN PATENT DOCUMENTS

| | | |
|---|---|---|
| JP | 2003-189477 A | 7/2013 |
| WO | WO 2011/039610 A1 | 4/2011 |

OTHER PUBLICATIONS

Form PCT/ISA/237 corresponding International Application No. PCT/JP2011/080460 dated Apr. 3, 2012.

* cited by examiner

POWER CONTROLLER

TECHNICAL FIELD

The invention relates to a power controller which comprises a power generator and an electrical storage device that are installed in a residential power system, and is provided for an electrical power system for grid connection.

BACKGROUND ART

Conventionally, there is proposed an electrical power system for grid connection, which includes a power generator and an electrical storage device, installed in a residential power system (for example, Japanese Patent Application Publication No. 2002-369406 (hereinafter referred to as "Document 1")). Document 1 discloses an electrical storage means (an electrical storage device) for storing generating energy from a solar battery (a power generator), and also describes that energy from a power supply system or generating energy from the solar battery is stored in the electrical storage means.

The generating energy from the solar battery is not only stored in the electrical storage means but also supplied to electric loads. Document 1 describes an energy selling (reverse power flow) condition for supplying the power supply system with the generating energy from the solar battery when energy supplied to the electric loads is smaller than the generating energy from the solar battery. The electrical storage means discharges the energy stored therein so as to prevent electric power of the power supply system from exceeding prescribed power. That is, in the technology described in Document 1, energy is allowed to flow back to the power supply system when the generating energy from the power generator exceeds demand energy for the electric loads and thereby excess energy is produced.

A power generator that generates electricity from natural energy, such as a solar battery is thought as an equipment with less environmental load, because no carbon dioxide is emitted when it generates electricity. In the existing circumstances, the introduction of this sort of power generators are prompted by setting a unit price of the generating energy flowing back to the power supply system, namely a selling price of electricity higher than a purchasing price of electricity from the power supply system, thereby giving returns by selling electricity.

In the technology described in Document 1, when the generating energy from the solar battery exceeds the demand energy for the electric loads, it is regarded that excess energy is produced, and the energy is allowed to flow back to the power supply system. The excess energy is however hard to be produced when a variation pattern of the generating energy is similar to that of the demand energy and the difference between the generating energy and the demand energy is small, because whether or not excess energy is produced is defined based on time variation between the generating energy and the demand energy. That is, some consumers can hardly obtain returns by reverse power flow owing to little excess energy.

Thus, the consumers with little excess energy may have a problem that it takes long years to recover investment costs for installing power generators. Increasing excess energy in order to collect such investment costs for a short period of time requires a change in daily rhythm so as to reduce demand energy in the daytime, so that adverse effects may occur in daily life.

SUMMARY OF INVENTION

It is an object of the present invention to provide a power controller configured to compensate for demand energy for an electric load through an electrical storage device to reduce energy which is contained in generating energy of a power generator and applied to the demand energy, thereby increasing energy which is contained in the generating energy of the power generator and allowed to flow back, and consequently to increase returns by selling electricity.

In order to achieve the object, the power controller (10) of the present invention is provided for a system comprising a power generator (30) and an electrical storage device (40) which are installed in a residential system. The power generator (30) is configured to generate electricity from natural energy. The electrical storage device (40) is configured to charge and discharge a battery (41). The system is configured to choose (at least one from) a power supply system (21), the power generator (30) and the electrical storage device (40) to supply energy to an electric load (24), and also to allow energy from the power generator (30) to flow back to the power supply system (21). The power controller (10) comprises a first energy acquisition part (101), a second energy acquisition part (102), an energy surplus judgment part (103) and an overall operation controller (106). The first energy acquisition part (101) is configured to acquire demand energy for the electric load (24) in the residential system. The second energy acquisition part (102) is configured to acquire generating power measured with respect to the power generator (30). The energy surplus judgment part (103) is configured to perform a conditional judgment about excess generating energy at prescribed intervals. The excess generating energy is a difference between the demand energy acquired through the first energy acquisition part (101) and the generating energy acquired through the second energy acquisition part (102). The overall operation controller (106) is configured to choose between charging and discharging of the electrical storage device (40) in response to a result of the conditional judgment through the energy surplus judgment part (103). The overall operation controller (106) is configured: without applying the generating energy of the power generator (30) to the demand energy, to allow it to be stored in the electrical storage device (40) when a first condition is established; and to apply the stored energy in the electrical storage device (40) to the demand energy for the electric load (24) when a second condition is established. The first condition corresponds to the case where the generating energy is equal to or less than the demand energy to which a predetermined judgment threshold is added. The second condition corresponds to the case where the generating energy exceeds the demand energy to which the judgment threshold is added.

In an embodiment, the judgment threshold is zero.

In an embodiment, the overall operation controller (106) is configured to apply the generating energy to the demand energy without charging even if the first condition is established in the energy surplus judgment part (103) when a remaining capacity of the battery (41) reaches a specified upper limit.

In an embodiment, the overall operation controller (106) is configured to be forbidden to perform charging even if the energy surplus judgment part (103) judges that the first condition is established, in a period of time in which a purchasing price of electricity from the power supply system (21) is equal to or more than a prescribed value in case the number of charging and discharging of the electrical storage device (40) exceeds a specified value in a prescribed period of time.

In an embodiment, the overall operation controller (106) is configured to be forbidden to discharge the electrical storage device (40) even if the energy surplus judgment part (103) judges that the second condition is established, in a period of time in which a selling price of electricity flowing back to the power supply system (21) is equal to or more than a prescribed value.

In an embodiment, the overall operation controller (106) is configured to allow energy from the power supply system (21) to be stored in the electrical storage device (40) if the first condition is established, in time slots when a purchasing price of electricity from the power supply system (21) is equal to or less than a specified value.

In an embodiment, the energy surplus judgment part (103) is configured to set the judgment threshold to a varied threshold.

In an embodiment, the energy surplus judgment part (103) is configured to set the judgment threshold to a relatively larger threshold in a period of time in which a remaining capacity of the battery (41) is equal to or less than a specified lower limit, and to set the judgment threshold to a relatively smaller threshold in a period of time in which the remaining capacity of the battery (41) is equal to or more than a specified upper limit.

In an embodiment, the energy surplus judgment part (103) is configured to set the judgment threshold to a positive threshold in a period of time in which a remaining capacity of the battery (41) is equal to or less than a specified lower limit and the generating energy is larger than the demand energy, and to set the judgment threshold to zero if the remaining capacity of the battery (41) exceeds the lower limit.

In an embodiment, the energy surplus judgment part (103) is configured to set the judgment threshold to a negative threshold in a period of time in which a remaining capacity of the battery (41) is equal to or more than a specified upper limit and the demand energy is larger than the generating energy, and to set the judgment threshold to zero if the remaining capacity of the battery (41) is less than the upper limit.

In an embodiment, the overall operation controller (106) is configured to control so that a remaining capacity of the battery (41) is equal to or less than the lower limit until a time slot, when a purchasing price of electricity from the power supply system (21) is equal to or less than a specified value, starts.

In an embodiment, the power controller (10) comprises a notification means that gives an advice on suppressing usage of the electric load (24) in a period of time in which the second condition is established in the energy surplus judgment part (103).

In an embodiment, in case the electric load (24) comprises a controller configured to receive a control signal to control electricity consumption thereof, the power controller (10) is configured so that the overall operation controller (106) supplies the control signal for suppressing electricity consumption to the controller of the electric load (24) in a period of time in which the second condition is established in the surplus judgment part (103).

In the invention, the demand power for the electric load (24) is compensated through the electrical storage device (40), and accordingly the energy which is contained in the generating energy of the power generator (30) and allocated to the demand energy is reduced, and energy which is contained in the generating energy of the power generator (30) and allowed to flow back increases. As a result, the returns by selling electricity are expected to increase.

BRIEF DESCRIPTION OF DRAWINGS

Preferred embodiments of the invention will now be described in further details. Other features and advantages of the present invention will become better understood with regard to the following detailed description and accompanying drawings where.

DESCRIPTION OF EMBODIMENTS

Figure 1:
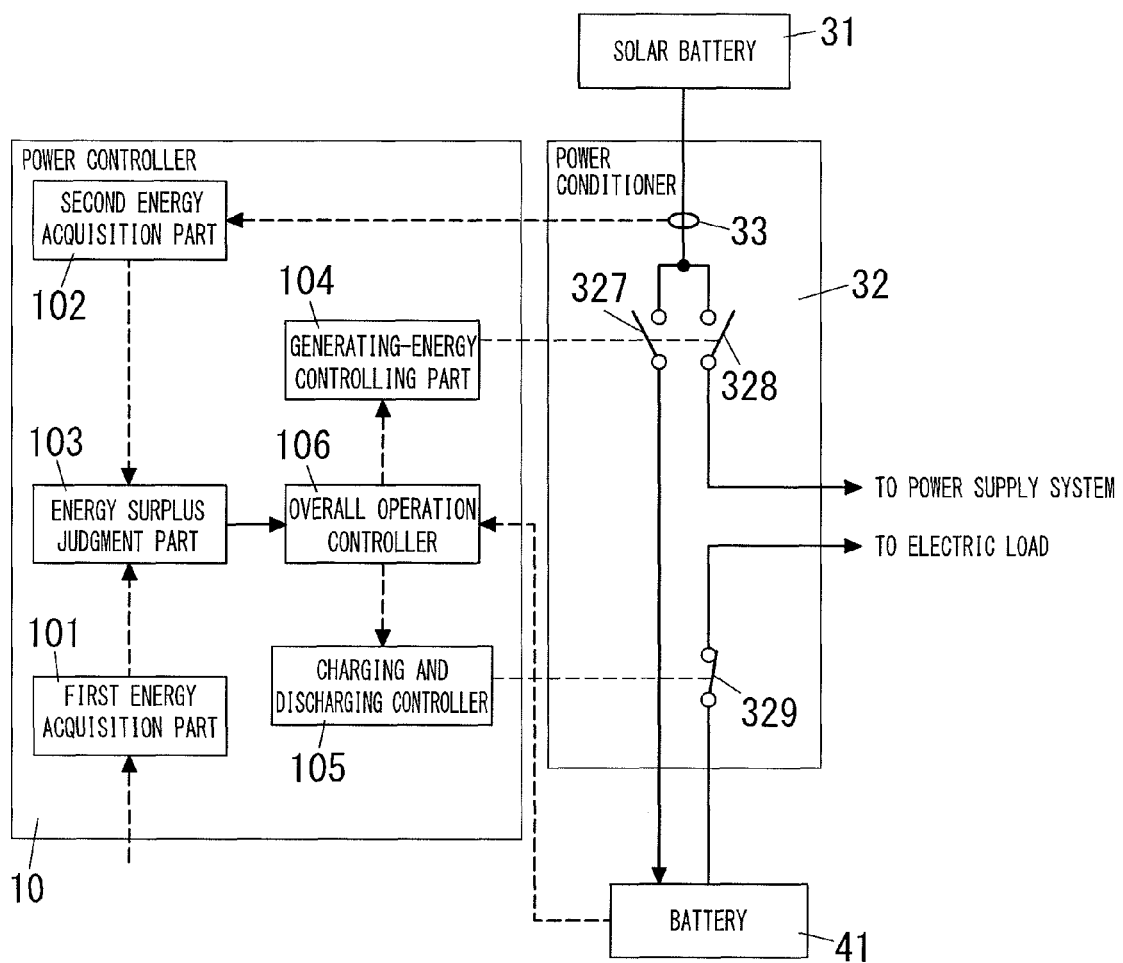
FIG. 1 is a block diagram showing an embodiment.

In an embodiment to be described, a photovoltaic power system is illustrated as a power generator (30) configured to generate electricity from natural energy, and a detached house is assumed for a residential system. The residential system is provided with an electrical storage device (40) for storing "generating energy" from the photovoltaic power system, and configured to allow the generating energy from the photovoltaic power system and "stored energy" in the electrical storage device to be supplied to electric loads (24) in the house. The system is further configured to allow the generating energy of the photovoltaic power system to flow back to a power supply system (21) that is managed by an electric power utility (i.e., a power company). "Demand energy" required for operations of the electric loads, the generating energy of the photovoltaic power system, and "utility energy" from the power supply system are each measured.

In the explanation below, "energy" means "electric energy" for a prescribed period of time. The prescribed period of time is a time interval for data acquisition which is used for calculation of a power controller (10) to be described. As the time interval is shorter, a delay in control is more suppressed, thereby enabling control with high accuracy. The time interval is however set to about 5 minutes to one hour in general in consideration of a system response. It is to be noted that data may be acquired at an interval of about one second to one minute in order to monitor time variation of energy.

In the present embodiment, the energy obtained by subtracting the demand energy from the generating energy is referred to as "excess generating energy" in order to distinguish it from "excess energy" to be flowed back to the power supply system. The excess generating energy is positive energy when the generating energy exceeds the demand energy, and negative energy when the generating energy falls below the demand energy. Each of the excess generating energy, the generating energy and the demand energy is electric energy per time interval for data acquisition which is used for calculation of the power controller, and substantially corresponds to an instantaneous value.

Embodiment 1

Figure 2:
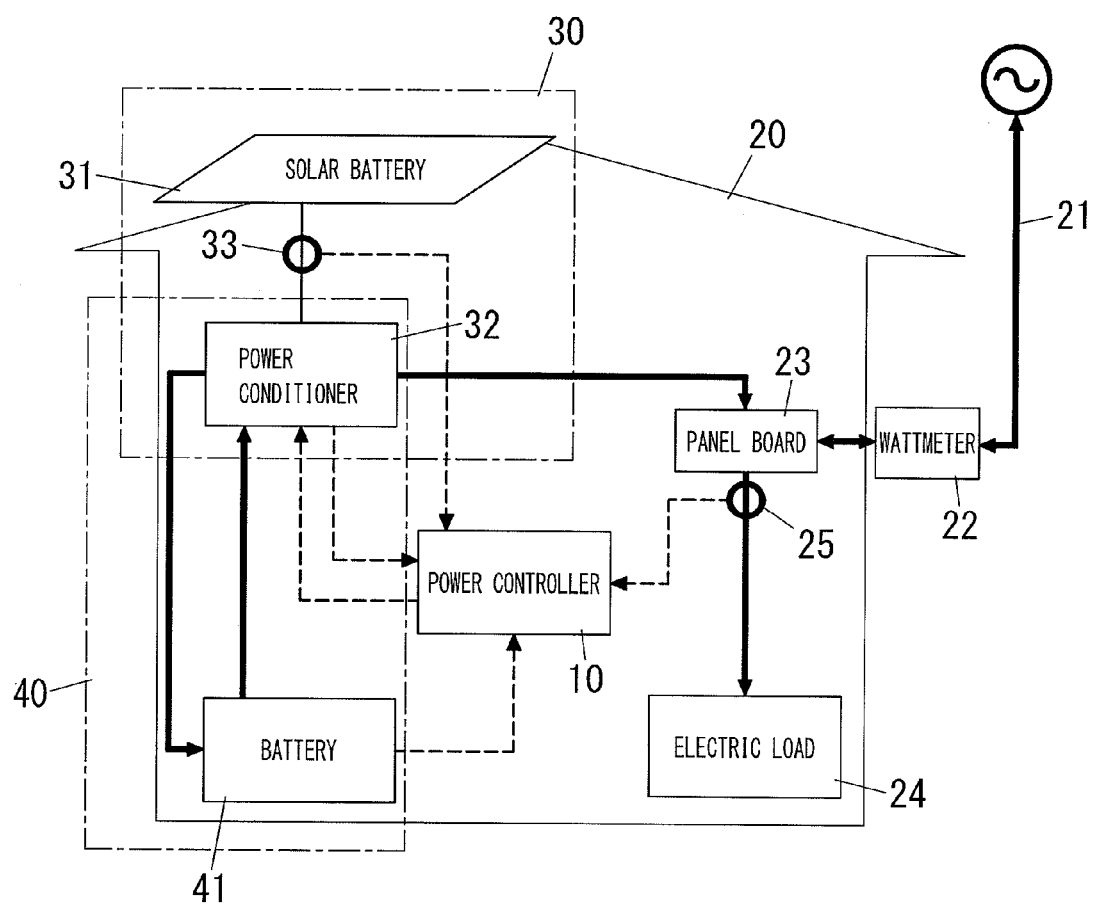
FIG. 2 is a schematic diagram showing an example of a system with the same.

A common configuration in embodiments to be described is explained as embodiment 1. As shown in FIG. 2, a residential (dwelling) system 20 is supplied with alternating-current power through a wattmeter 22 from the power supply system 21 that is managed by an electric power utility. A panel board 23 for distributing energy to the electric loads 24 in a house is disposed in the residential system 20. The system is also provided with a demand-energy measuring means 25 configured to measure, as demand energy, a total amount of energy supplied to the electric loads 24 through the panel board 23. For example, an electronic type of energy measuring device is employed as the demand-energy measuring means 25, and configured to measure energy through a current sensor such as a current transformer and a voltage sensor for measuring a supply voltage.

In the illustrated example, the demand energy for the electric loads 24 is measured outside the panel board 23, but may be measured inside the panel board 23. In addition, each electric load 24 may be provided with a communication facility so that energy (energy consumption or energy to be consumed) which each electric load 24 necessitates is acquired from each electric load 24 through communication. Alternatively, a measuring device configured to measure energy consumption of an electric load 24 may be provided with a communication facility so that the energy consumption of the electric load 24 is acquired from the measuring device through communication.

The power generator 30 is installed in the residential system 20, and is the photovoltaic power system in the embodiment. The photovoltaic power system 30 is formed of a solar battery 31 configured to generate electricity from sunlight, and a power conditioner 32 having a function configured to perform power conversion of direct-current power from the solar battery 31. In addition, a battery 41 for storing the generating energy from the photovoltaic power system 30 is disposed in the residential system 20. The battery 41 is connected to the power conditioner 32 which is configured to charge and discharge the battery 41. The battery 41 therefore forms an electrical storage device 40 along with the power conditioner 32.

The photovoltaic power system 30 includes a generating-energy measuring means 33 configured to measure the generating energy. In the illustrated example, the generating-energy measuring means 33 is provided between the solar battery 31 and the power conditioner 32. The power conditioner 32 performs the power conversion, and accordingly the generating energy measuring means 33 may be configured to measure the energy after the power conversion in consideration of conversion efficiency. For example, an electronic type of energy measuring device is employed as the generating-energy measuring means 33 like the demand-energy measuring means 25, and configured to measure energy through a current sensor and a voltage sensor.

Figure 3:
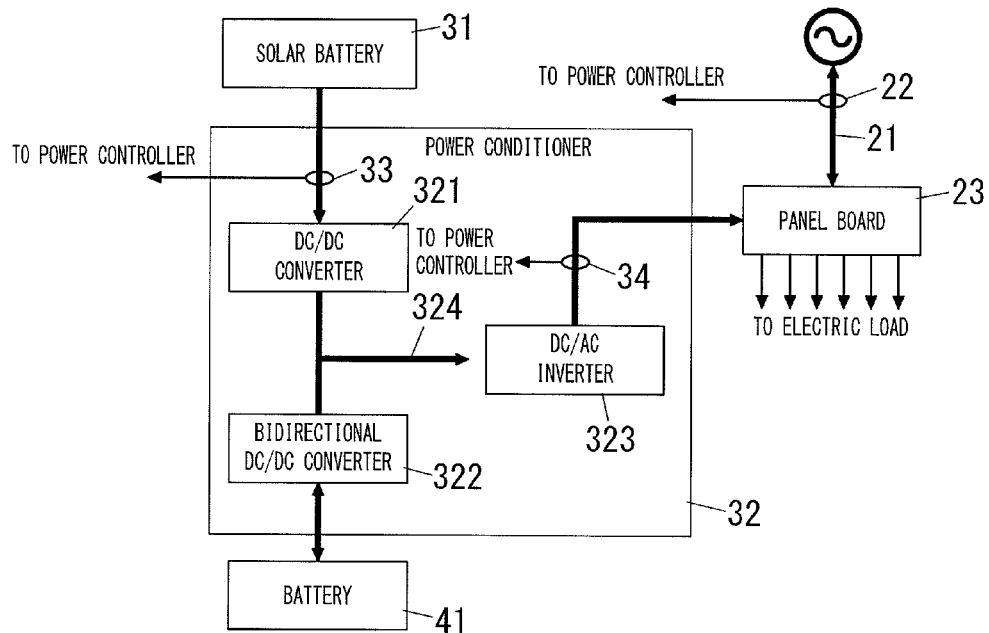
FIG. 3 is a block diagram showing an example of main parts in the system of FIG. 2.

FIG. 3 shows a configuration example of the power conditioner 32. The power conditioner 32 shown in FIG. 3 includes a DC/DC converter 321 that has a maximum power point tracker (MPPT) with respect to direct-current power from the solar battery 31, and a function for stabilizing the direct-current voltage. The power conditioner 32 also includes a bidirectional DC/DC converter 322 that is configured to charge and discharge the battery 41. Output ends of the DC/DC converter 321 and first input and output ends of the bidirectional DC/DC converter 322 are connected to a DC bus 324. The power conditioner 32 includes a DC/AC inverter 323 configured to convert direct-current power supplied from the DC bus 324 into alternating-current power. That is, input ends of the DC/AC inverter 323 are connected to the DC bus 324. Therefore, the DC/AC inverter 323 is configured to convert each direct-current power from the DC/DC converter 321 and the bidirectional DC/DC converter 322 into alternating-current power.

Output ends of the DC/AC inverter 323 are connected to the panel board 23 which performs, therein, grid connection between the power supply system 21 and dispersed power sources (the photovoltaic power system 30 and the electrical storage device 40) including the power conditioner 32. The panel board 23 is configured to choose (at least one from) a function for connecting the photovoltaic power system 30 to the power supply system 21 to allow energy to flow back, a function for supplying energy in the electrical storage device 40 to the electric loads 24, and a function for supplying energy from the power supply system 21 to the electrical storage device 40.

The power conditioner 32 includes an output-energy measuring means 34 configured to measure output energy of the DC/AC inverter 323. An electronic type of energy measuring device is employed as the output-energy measuring means 34 like the demand-energy measuring means 25 and the generating-energy measuring means 33. It is desirable that the electronic type of energy measuring devices should be configured to output a digital value representing a measured value.

Figure 4:
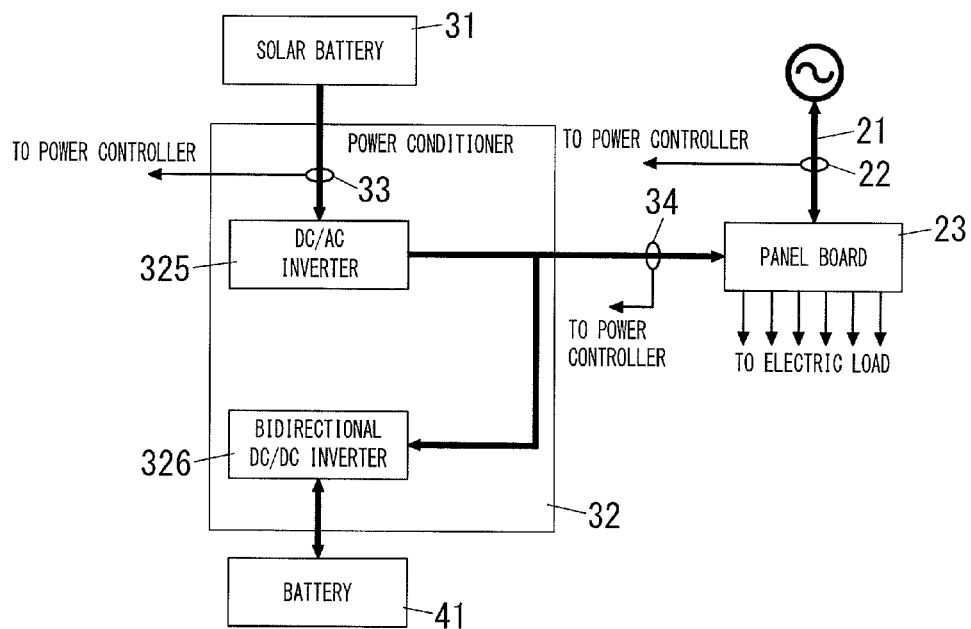
FIG. 4 is a block diagram showing another example of main parts in the system of FIG. 2.

Besides the aforementioned configuration, various modifications may be applied to the power conditioner 32. For example, a configuration may be adopted that as shown in FIG. 4, the DC/AC inverter 323 shown in FIG. 3 is removed and the DC/DC converter 321 and the bidirectional DC/DC converter 322 are replaced with a DC/AC inverter 325 and a bidirectional DC/AC inverter 326, respectively. That is, the direct-current power from the solar battery 31 is converted into alternating-current power through the DC/AC inverter 325, and the battery 41 is charged and discharged through the bidirectional DC/AC inverter 326. In the example shown in FIG. 4, the output-energy measuring means 34 is provided outside the power conditioner 32.

In the above-mentioned configuration, the demand energy is measured through the demand-energy measuring means 25, but the output-energy measuring means 34 is provided, and accordingly the difference between the utility energy measured through the wattmeter 22 and the output energy measured through the output-energy measuring means 34 may be used for the demand energy. Conversely, the output-energy measuring means 34 may be removed in case the demand-energy measuring means 25 is provided.

In the configuration shown in FIG. 3, the utility energy from the power supply system 21 cannot be stored in the battery 41, but in the configuration shown in FIG. 4, the utility energy from the power supply system 21 can be stored in the battery 41. In FIG. 4, the DC/AC inverter 325 and the bidirectional DC/AC inverter 326 are commonly connected to the panel board 23, but may be selectively connected to the power supply system 21 and the electric loads 24.

In this case, the power conditioner 32 shown in FIG. 4 is configured to selectively connect the DC/AC inverter 325 to one of the bidirectional DC/AC inverter 326 and the panel board 23. The power conditioner 32 is also configured: to supply energy from the power supply system 21 to the electric loads 24 when choosing a path from the DC/AC inverter 325 to the bidirectional DC/AC inverter 326, and to supply energy from the bidirectional DC/AC inverter 326 to the electric loads 24 when allowing energy from the DC/AC inverter 325 to flow back to the power supply system 21. That is, energy is forbidden to flow back and forth between the power supply system 21 and the bidirectional DC/AC inverter 326. The choice from a set of such connection relations is controlled through the power controller 10.

The power controller 10 realizes the following operations by running a suitable program with a computer (a microcomputer). That is, as shown in FIG. 1, the power controller 10 includes a first energy acquisition part 101 configured to acquire the demand energy, and a second energy acquisition part 102 configure to acquire the generating energy of the photovoltaic power system 30 through the generating-energy measuring means 33.

An assumed configuration in which the first energy acquisition part 101 acquires the demand energy from the demand-energy measuring means 25 is explained. However, the configuration may be adopted that the first energy acquisition part 101 is configured to acquire the utility energy from the watt-meter 22 and also to acquire the output energy from the output-energy measuring means 34 to calculate the demand energy. The second energy acquisition part 102 is configured to acquire the generating energy from the generating-energy measuring means 33.

The demand energy acquired through the first energy acquisition part 101 and the generating energy acquired through the second energy acquisition part 102 are supplied to the energy surplus judgment part 103. The energy surplus judgment part 103 is configured to calculate the excess generating energy by subtracting the demand energy from the generating energy.

In FIG. 1, the power conditioner 32 is briefly illustrated, and three switches 327, 328 and 329 schematically represent the configuration for choosing paths for supplying and receiving energy with respect to the photovoltaic power system 30 and the electrical storage device 40.

In the illustrated example, two switches 327 and 328 are connected to the solar battery 31. The solar battery 31 is connected to the battery 41 through one (a first) switch 327, and connected to the power supply system 21 through another (a second) switch 328 (see FIG. 2). The switches 327 and 328 are controlled so that one of them is turned on and then the other is turned off. Therefore, the turn-on of the switch 327 represents that the generating energy of the photovoltaic power system 30 is stored in the electrical storage device 40, and the turn-on of the switch 328 represents that the generating energy from the photovoltaic power system 30 is allowed to flow back to the power supply system 21. The (third) switch 329 is connected between the battery 41 and the electric loads 24 (see FIG. 2). The turn-on of the switch 329 represents that the stored energy in the electrical storage device 40 is supplied to the electric loads 24.

The utility energy from the power supply system 21 is supplied to the electric loads 24, and accordingly energy classification (what is called coloring) is performed so that the stored energy is forbidden to flow back. Classifying energy is provided with multiple path switching means for choosing paths, through which electric loads 24 are supplied with energy, by subunit (by the branch circuit of the panel board 23, by the electric load 24, or the like). What is needed is to choose supply paths with respect to the stored energy and the utility energy through the above-mentioned means so that they meet the demand energy. In this case, the stored energy is preferentially used for the demand energy, and the utility energy compensates for a shortage thereof.

The power controller 10 includes a generating-energy controller 104 for controlling ON and OFF of the switches 327 and 328, and a charging and discharging controller 105 for controlling ON and OFF of the switch 329. The generating energy controller 104 and the charging and discharging controller 105 are configured to control ON and OFF of the switches 327, 328 and 329 in accordance with instructions received from an overall operation controller 106. The overall operation controller 106 is configured to receive a judgment result of the energy surplus judgment part 103 to decide an ON and OFF state of each of the switches 327, 328 and 329 in response to the condition to be described.

The overall operation controller 106 respectively turns the switches 327 and 328 on and off through the generating-energy controlling part 104 as a fundamental operation while the energy surplus judgment part 103 judges that the excess generating energy is negative (i.e., generating energy<demand energy). The overall operation controller 106 also turns the switch 329 off through the charging and discharging controller 105. That is, when the generating energy is smaller than the demand energy, the energy from the photovoltaic power system 30 is stored in the electrical storage device 40, while the power supply from the electrical storage device 40 to the electric loads 24 is prohibited.

The overall operation controller 106 respectively turns the switches 327 and 328 off and on through the generating-energy controlling part 104 while the energy surplus judgment part 103 judges that the excess generating energy is positive (i.e., generating energy>demand energy). The overall operation controller 106 also turns the switch 329 on through the charging and discharging controller 105. That is, when the generating energy is larger than the demand energy, the electrical storage device 40 is forbidden to store the energy from the photovoltaic power system 30, and the energy in the electrical storage device 40 is supplied to the electric loads 24.

In this case, in consideration of the energy which can be supplied from the electrical storage device 40 (which is decided by a remaining capacity of the battery 41 and the output energy of the DC/AC inverter 323), the generating energy of the photovoltaic power system 30 is also supplied to the electric loads 24 when the demand energy for electric loads 24 exceeds the energy which can be supplied from the electrical storage device 40. In addition, if the excess energy still remains (excess energy=demand energy−(stored energy+generating energy)>0), the excess energy of the photovoltaic power system 30 is allowed to flow back to the power supply system 21. In short, when the stored energy exceeds the demand energy, the whole of the generating energy is allowed to flow back. Therefore, returns are obtained by selling the excess energy. When no excess energy is produced, the power supply system 21 compensates for a shortage with respect to the demand energy for the electric loads 24. That is, the utility energy is consumed.

In the present embodiment, presence or non-presence of the excess generating energy is judged by only comparison in size between the generating energy and the demand energy, but it is desirable that presence or non-presence of the excess generating energy is judged by comparing the generating energy with the demand energy to which a predetermined judgment threshold is added. Ideally, the generating energy can compensate for the demand energy if the generating energy exceeds the demand energy, but in fact losses arise, and it is accordingly preferable that the generating energy should be compared with the demand energy to which the judgment threshold is added. However, in the embodiment, the judgment threshold is zero for the purpose of simplicity.

The stored energy in the electrical storage device 40 compensates for part of the demand energy for the electric loads 24 through the aforementioned operation, thereby easily obtaining the excess energy from the generating energy of the photovoltaic power system 30. In other words, the energy corresponding to the stored energy is added to the excess energy that is allowed to flow back. That is, the utility energy from the power supply system 21 is smoothed, because the utility energy from the power supply system 21 is applied to the demand energy while the generating energy is stored in the electrical storage device 40, and the stored energy is supplied to the electric loads 24 while the excess generating energy is produced. While the excess generating energy is produced, energy is supplied to the electric loads 24 in the preferential order of the stored energy in the electrical storage device 40, the generating energy of the photovoltaic power system 30, and the utility energy from the power supply system 21.

In the operation, only the stored energy in the electrical storage device 40 is supplied to the electric loads 24, and the stored energy is forbidden to flow back to the power supply system 21. That is, it can be regarded that the electrical storage device 40 performs a time shift with respect to the utility energy from the power supply system 21.

The aforementioned operation relates to cases where the electrical storage device 40 can be charged and discharged. However, when the remaining capacity of the battery 41 reaches the upper limit regarded as full charge, the battery 41 should be forbidden to be charged. In this case, even if the generating energy is smaller than the demand energy, the overall operation controller 106 respectively turns the switches 237 and 239 off and on to supply energy from the photovoltaic power system 30 to the electric loads 24, and also halts charging the battery 41 and supplies the energy in the electrical storage device 40 to the electric loads 24. When the remaining capacity of the battery 41 reaches the lower limit regarded as zero, even if the generating energy is larger than the demand energy, the overall operation controller 106 forbids power supply from the electrical storage device 40 to the electric loads 24, because the stored energy cannot be supplied from the electrical storage device 40.

Figure 5:
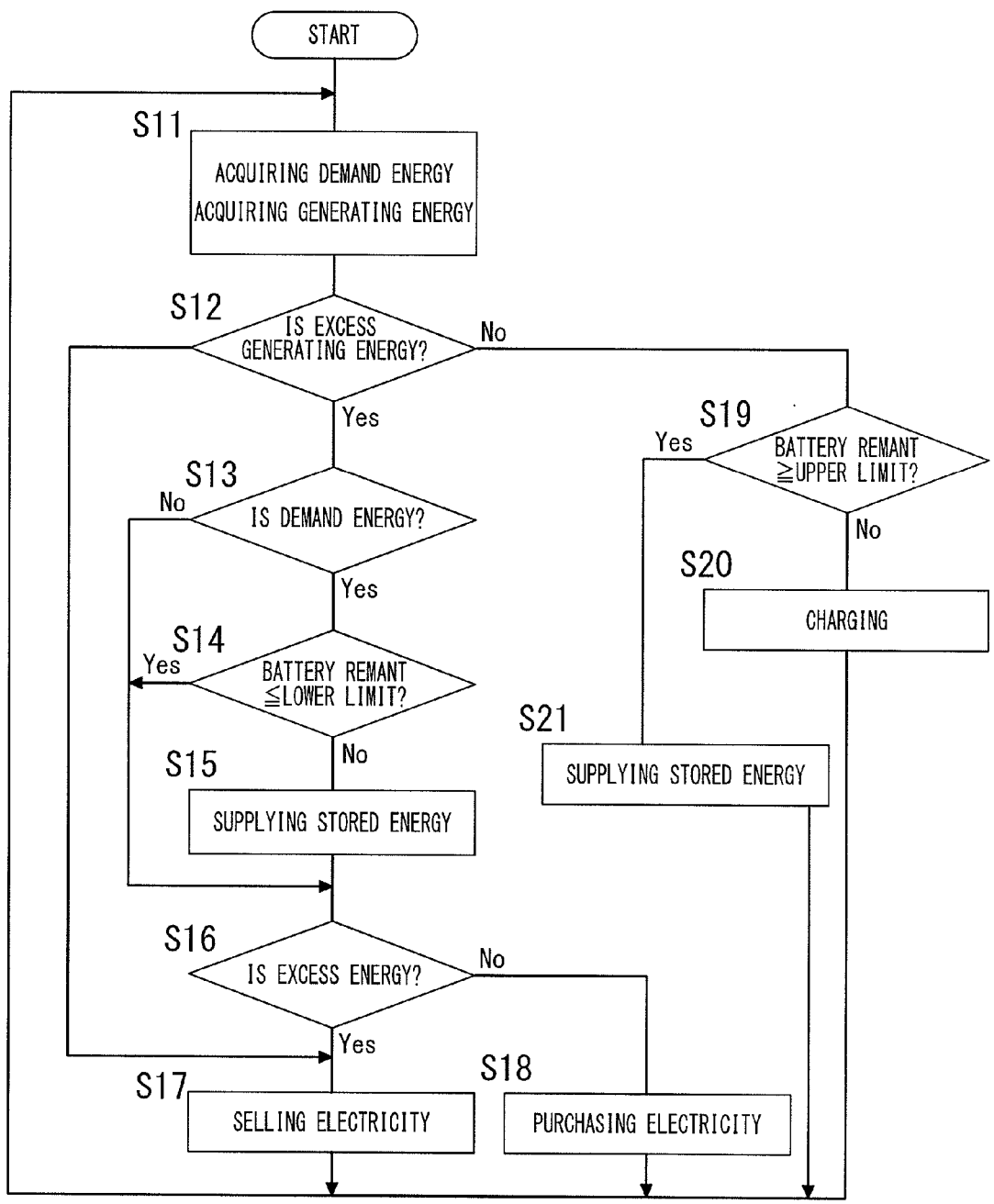
FIG. 5 is an explanatory diagram of an operation thereof.

The operations of the power controller 10 are described together in FIG. 5. In the power controller 10, the first energy acquisition part 101 acquires the demand energy measured with the demand-energy measuring means 25, and the second energy acquisition part 102 acquires the generating energy measured with the generating-energy measuring means 33 (S11). The energy surplus judgment part 103 then judges presence or non-presence of the excess generating energy (S12), the stored energy is supplied from the electrical storage device 40 (S15) if the excess generating energy is produced (S12: Yes) and the demand energy occurs (S13: Yes).

Here, the stored energy is supplied from the electrical storage device 40 when the remaining capacity of the battery 41 exceeds the lower limit (S14: No), while energy is forbidden to be supplied from the electrical storage device 40 when the remaining capacity of the battery 41 is equal to or less than the lower limit (S14: Yes). In step S13, if no demand energy occurs (S13: No), the generating energy is stored in the electrical storage device 40 or allowed to flow back to the power supply system 21 (S17). The excess generating energy is also produced, and accordingly the stored energy and the generating energy are applied to the demand energy. If the excess energy is still produced (S16: Yes), the excess energy is allowed to flow back to the power supply system 21 (S17). In step 16, when no excess energy is produced, energy is supplied from the power supply system 21 to the electric loads 24, and the utility energy is consumed.

In step S12, when no excess generating energy is produced (S12: No) and the remaining capacity of the battery 41 is under the upper limit (S19: No), the generating energy is stored in the electrical storage device 40 (S20). In step S19, when the remaining capacity of the battery 41 is equal to or more than the upper limit (S16: Yes), the generating energy is forbidden to be stored in the electrical storage device 40 and applied to the demand energy for the electric loads 24 (S21). In this case, only the generating energy cannot compensate for the demand energy for the electric loads 24, because the excess generating energy is not produced. Therefore, the utility energy from the power supply system 21 compensates for the rest of the demand energy. This operation is similar to the operation in case the electrical storage device 40 is not provided.

Examples of cases where the remaining capacity of the battery 41 reaches the upper limit include: the case where a state that no excess generating energy is produced continues for a long time; the case where the generating energy in a period of time when no excess generating energy is produced is almost the same level as the generating energy in a period of time when the excess generating energy is produced, and the total period of time when no excess generating energy is produced is longer; and the like.

By performing the aforementioned operations, it is possible to prevent unwanted power loss from occurring to effectively use the generating energy, without giving the generating energy to the electrical storage device 40 despite unable to charge the battery 41.

In step S11, the generating energy and the demand energy are repeatedly acquired at prescribed intervals. For example, each interval is set to about 5 minutes to one hour. The generating energy and the demand energy change every moment, and it is accordingly desirable to acquire the generating energy and the demand energy at short intervals (about one second to one minute) and to employ an integrated value for the prescribed interval.

Figure 6:
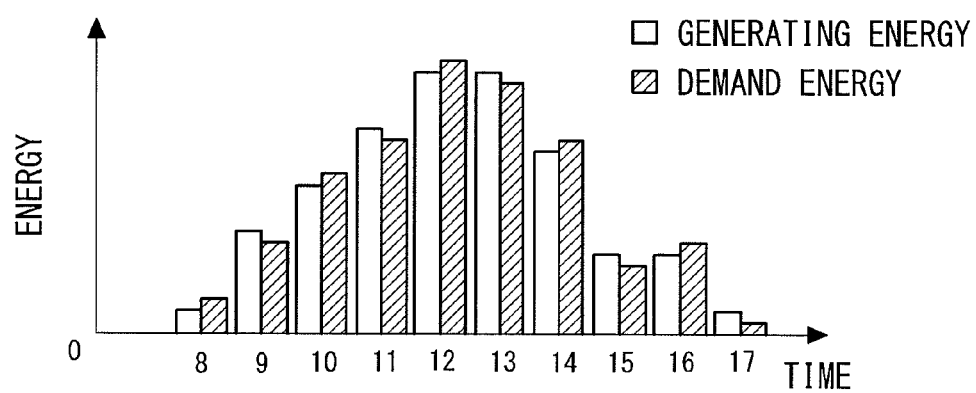
FIG. 6 is a chart showing an example of power condition.

An operation example in case the power controller 10 is provided is explained. FIG. 6 shows an example of one-day transition of the generating energy (outline bars) and the demand energy (hatched bars) in the residential system 20. In the illustrated example, the generating energy and the demand energy are acquired at intervals of one hour. The time slots from 18:00 to 07:00 of the next day are not shown in FIG. 6, because the power generator is the photovoltaic power system 30 and the generating energy is not obtained in the night. In short, the generating energy of the photovoltaic power system 30 is obtained from sunrise, and increases as time goes by, and reaches a maximum in the daytime, and decreases before long, and is not available at and after sunset. In the illustrated example, the demand energy and the generating energy change in the same way with each other, and are small in the morning and evening, and are maximums around noon.

In each time slot of 08:00 slot, 10:00 slot, 12:00 slot, 14:00 slot and 16:00 slot, the demand energy is larger than the generating energy, and accordingly the utility energy from the power supply system 21 is consumed. In each time slot of 09:00 slot, 11:00 slot, 13:00 slot, 15:00 slot and 17:00 slot, the generating energy is larger than the demand energy, and accordingly the excess generating energy is produced.

Figure 7:
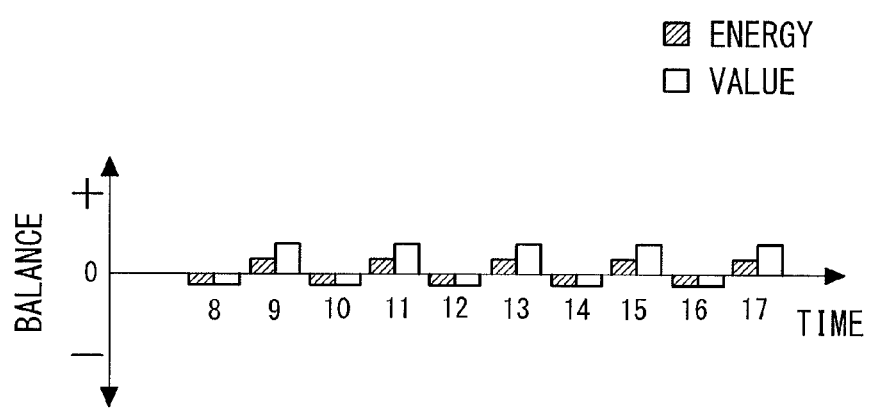
FIG. 7 is a chart showing a comparative operation under the condition of FIG. 6.

In case the demand energy and the generating energy change as shown in FIG. 6, if the electrical storage device 40 is not installed, the whole of the excess generating energy is dealt as the excess energy and allowed to flow back to the power supply system 21. FIG. 7 shows energy balances and value balances of selling and purchasing electricity in case the selling price of electricity is higher than the purchasing price of electricity (for example, it is assumed that the selling price of electricity is JPY 48/kWh, and the purchasing price of electricity is JPY 20/kWh).

In FIG. 7, the hatched bars show energy balances, and the outline bars show value balances. FIG. 7 also shows the balances based on the reference line corresponding to zero, and the upper side with respect to the reference line (the time axis) represents selling electricity and generating profits, and the lower side with respect to the reference line represents purchasing electricity and occurring losses. It is appreciated from the figure that the returns by selling electricity per day are low when the demand energy and the generating energy change as shown in FIG. 6. That is, even monthly cumulative returns obtained by selling electricity are still low.

Figure 8:
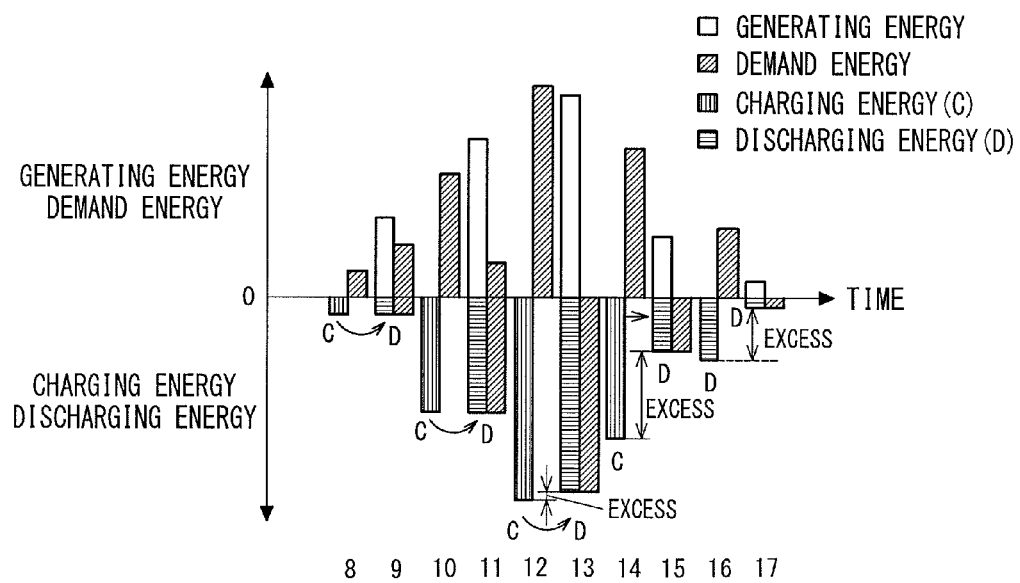
FIG. 8 is a chart showing an operation under the condition of FIG. 6.

According to the aforementioned operations through the electrical storage device 40, when the generating energy and the demand energy change as shown in FIG. 6, the energy balances change as shown in FIG. 8. In FIG. 8, the upper side of the horizontal axis shows generating energy (outline bars) or demand energy (hatched bars), and the lower side of the horizontal axis shows energy stored in the electrical storage device 40 (energy that is shown by vertical lines and described as "charging energy (C)") and energy discharged from the electrical storage device 40 (energy that is shown by horizontal lines and described as "discharging energy (D)").

In FIG. 8, part of demand energy growing up and down across the horizontal axis shows that the stored energy in the electrical storage device 40 compensates for part of the demand energy. That is, the energy stored in the electrical storage device 40 in a period of time when no excess generating energy is produced is applied to part of the demand energy in a period of time when the excess generating energy is produced (see arrows of FIG. 8), thereby widening the gap between the remaining demand energy and the generating energy to consequently increase excess energy that is allowed to flow back. Time slots when no excess energy is produced represent purchasing electricity from the power supply system 21. In FIG. 8 (see "EXCESS"), energy of the electrical storage device 40 is kept in time slots when the energy discharged from the electrical storage device 40 is smaller than the energy stored in the electrical storage device 40 (the time slots of 12-13, 14-15 and 16-17). The energy kept in the electrical storage device 40 is consumed in the next day (in the illustrated example, in the morning of the next day). In the night, the stored energy in the electrical storage device 40 is not applied to the demand energy, because the excess generating energy is not available.

Figure 9:
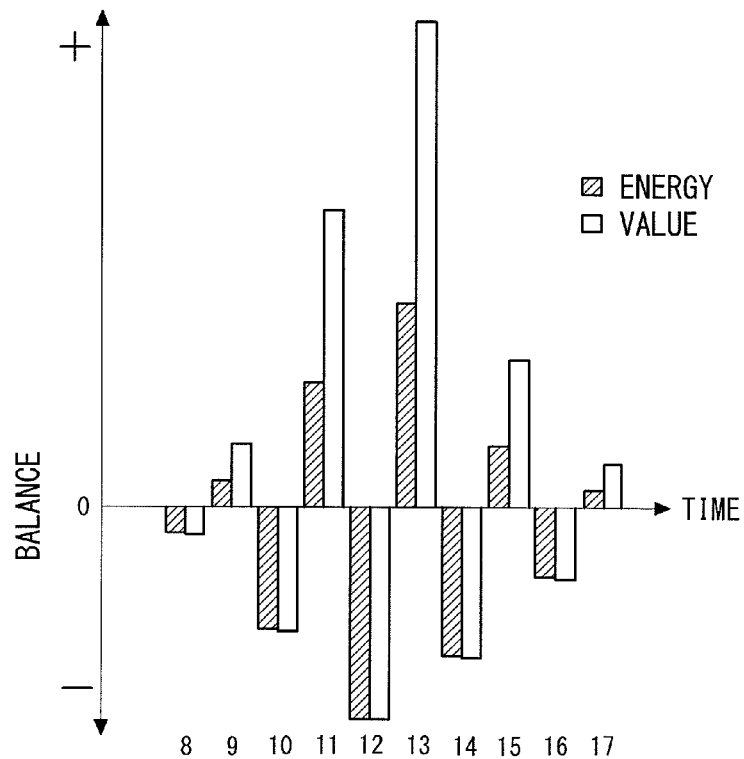
FIG. 9 is a chart showing balance under the condition of FIG. 6.

FIG. 9 shows energy balances and value balances by selling electricity and purchasing electricity, corresponding to the example shown in FIG. 8. FIG. 9 is illustrated in the same way as FIG. 7. It is realized from the comparison between FIGS. 7 and 9 that in the example of FIG. 9, energy balances and value balances deteriorate temporarily in time slots when no excess generating energy is produced in the morning, because energy is not allowed to flow back, but energy balances and value balances are improved greatly when the excess generating energy increases. That is, it is possible to increase the returns by selling electricity per day, thereby increasing monthly cumulative returns obtained by selling electricity, in comparison with the case where the electrical storage device 40 is not installed.

In the example of the above-mentioned configuration, it is assumed that only generating energy is stored in the electrical storage device 40, and the stored energy in the electrical storage device 40 is consumed only for compensating for the demand energy. The operation can be secured by performing power conversion only from the DC bus 324 to the panel board 23 through the DC/AC inverter 323 in case the power conditioner 32 is configured as shown in FIG. 3. According to this configuration, it is possible to securely prevent the utility energy from the power supply system 21 from being stored in the electrical storage device in the simplified hardware configuration.

In case the power conditioner 32 is configured as shown in FIG. 4, what is needed is to perform energy classification (coloring) as stated above to prove that only generating energy is stored in the electrical storage device 40. Alternatively, in case the utility energy from the power supply system 21 is stored in the electrical storage device 40, what is needed is to prove that the utility energy from the power supply system 21 is applied only to the demand energy. For example, when the stored energy in the electrical storage device 40 was the utility energy from the power supply system 21, the energy classification is performed so that it is applied only to the demand energy in the night to prove that the stored energy in the electrical storage device 40 is forbidden to flow back.

In the above operation, the electrical storage device 40 is selectively charged or discharged based on the information of only excess generating energy. In this instance, there is a case that the stored energy in the electrical storage device 40 cannot compensated for the demand energy when the electric loads 24 increases while the excess energy is produced and the stored energy is applied to the demand energy. In this case, the generating energy is applied to a shortage of demand energy, thereby consequently reducing the energy that is allowed to flow back to the power supply system 21. Moreover, when the stored energy in the electrical storage device 40 is applied to the demand energy, large losses occur in comparison with the case where the utility energy from the power supply system 21 is applied to the demand energy, because losses caused by charging and discharging thereof occur.

That is, it is possible to reduce energy losses by increasing the electric loads 24 in a period of time when the generating energy is stored in the electrical storage device 40 without the excess generating energy, rather than increasing the electric loads 24 in a period of time when the excess generating energy is produced and the stored energy in the electrical storage device 40 is applied to the demand energy. It is therefore desirable that users of the electric loads 24 in the residential system should be notified of the advice on suppressing the usage of the electric loads 24 in a period of time when the excess generating energy is produced in the energy surplus judgment part 103 and the stored energy in the electrical storage device 40 is applied to the demand energy. Conversely, they may be notified of the advice that the usage of the electric loads 24 may be increased in a period of time when the generating energy is stored in the electrical storage device 40 without excess generating energy. For this sort of notification, the power controller 10 is preferably provided with a notification means (not shown) for notifying the judgment result of the energy surplus judgment part 103 of a user(s).

In case an electric load(s) 24 includes a controller(s) configured to receive an external signal to control electricity consumption thereof, a control signal as an external signal for controlling the electricity consumption may be supplied to the controller(s) in place of the notification means. For example, electric loads 24 such as an air conditioner, a water heater and the like may include JEM-A terminals (what is called HA terminals) in conformity with a standard of Japan Electrical Manufacture's Association. The electric load 24 with the JEM-A terminal includes a controller configured to instruct operations and suspension thereof by control signals, and also enables monitoring conditions of the operations and suspension by monitor signals. The controller compliant to the JEM-A terminal controls only operations and suspension thereof. However, there are provided electric loads 24 with controllers configured to monitor and control such as temperature control, luminous energy control or the like.

When an electric load(s) 24 has the controller, it is desirable that the instruction should be supplied to the controller of the electric load 24 to increase and decrease the demand energy in response to presence or non-presence of the excess generating energy in the energy surplus judgment part 103. Specifically, it is desirable that the overall operation controller 106 should supply the control signal to the controller so that electricity consumption of the electric load 24 is suppressed in a period of time when the condition for choosing discharging of the electrical storage device 40 is established in the energy surplus judgment part 103.

As mentioned above, it is desirable to adopt the configuration for: inviting a user to increase or decrease the demand energy for electric loads 24 by notifying the user in response to presence or non-presence of the excess generating energy; or automatically increasing or decreasing the demand energy for electric loads 24 in response to presence or non-presence of the excess generating energy. In this case, it is possible to reduce the switching frequency for charging and discharging the electrical storage device 40, and moreover to reduce energy losses caused by charging and discharging the electrical storage device 40 in the overall operation, thereby consequently expecting to increase returns obtained by selling electricity.

Embodiment 2

In embodiment 1, the electrical storage device 40 is selectively charged and discharged in accordance with only the condition of presence and non-presence of the excess generating energy. The charging and discharging are therefore repeated in a period of time when the photovoltaic power system 30 produces the generating energy. Existing available batteries 41 have limitation in cycle number, because they are deteriorated by repetition of charging and discharging thereof. That is, the battery (41) life may be shortened if charging and discharging thereof are repeated.

Factors for deciding returns by selling electricity include the unit price of utility energy from the power supply system 21, and the unit price of energy flowed back to the power supply system 21. These prices may change by daily time slots or yearly seasons (exchange rates or fuel prices). In the present circumstances, the selling price of electricity is higher than the purchasing price of electricity, and it is accordingly possible to increase the returns by selling electricity, by applying the stored energy in the electrical storage device 40 to the demand energy in time slots relevant to large difference between the price of energy to flow back to the power supply system and the price of utility energy. On the contrary, the returns by selling electricity are not affected so much even if charging and discharging of the electrical storage device 40 is stopped in time slots relevant to a small difference between selling price of electricity and the purchasing price of electricity, owing to small returns by selling electricity.

In view of the above circumstances, the embodiment acquires unit price information of the utility energy from an electric power utility through a non-illustrated configuration (e.g., a configuration for acquiring information via the internet) to choose whether or not to operate the electrical storage device 40 based on the information. By comparing the difference between the selling price of electricity and the purchasing price of electricity with a specified threshold, an overall operation controller 106 decides whether or not to operate the electrical storage device 40, and stops the electrical storage device 40 from operating in time slots when the difference is equal to or less than the threshold. The operation precedes the conditional judgment in the energy surplus judgment part 103, and even if the condition for choosing to charge the electrical storage device 40 is established in the energy surplus judgment part 103, the electrical storage device is not charged.

It is also desirable that the operation should be performed only when the number of times that the electrical storage device 40 is charged and discharged within a prescribed period of time (e.g., one day, one week) exceeds a specified number of times (e.g., 3 to 5 times per day). In this case, what is needed is that it is made to return to a normal operation after the elapse of the prescribed period of time.

According to the operation, it is possible to reduce the frequency for charging and discharging the battery 41 to consequently protect the life of the battery 41, while ensuring returns by selling electricity. In order to judge the life of the battery 41, the aforementioned microcomputer is configured to count the number of times of the battery's charging and discharging since the initial use of the battery 41, and to judge that the battery reaches the end of its life when the counted number of times reaches a specified threshold (e.g., 300 times). In this case, it is desirable that the microcomputer should be provided with a backup power supply. The microcomputer, namely the power controller 10 is configured to stop the operation for charging and discharging the electrical storage device 40 to indicate the alert for battery (41) exchange or the like when it judges that the battery 41 reaches the end of its life.

Figure 10:
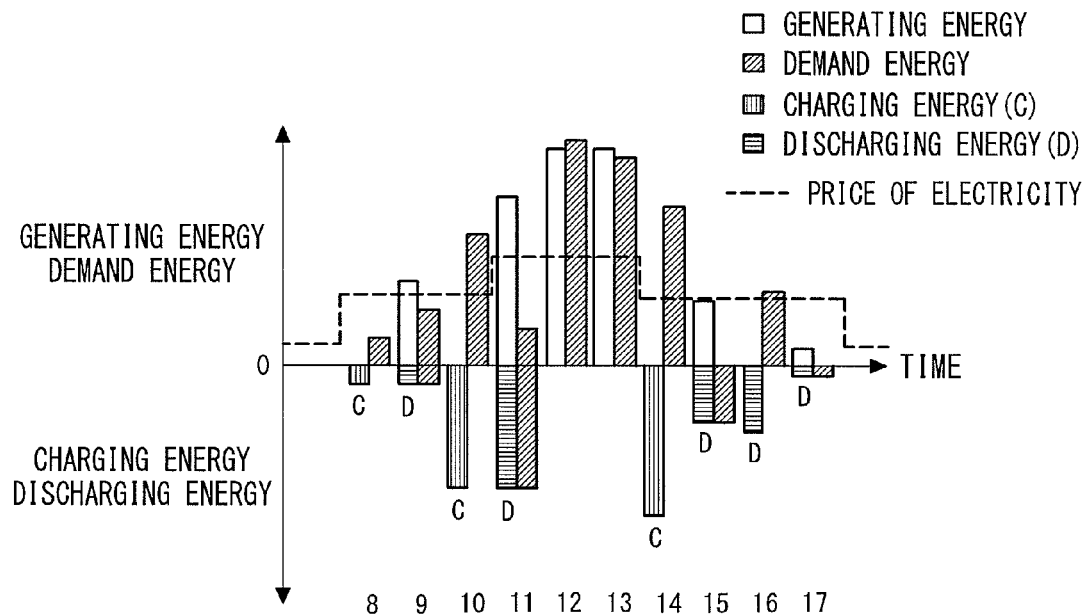
FIG. 10 is a chart showing an operation under the condition of FIG. 6 in a second embodiment.
Figure 11:
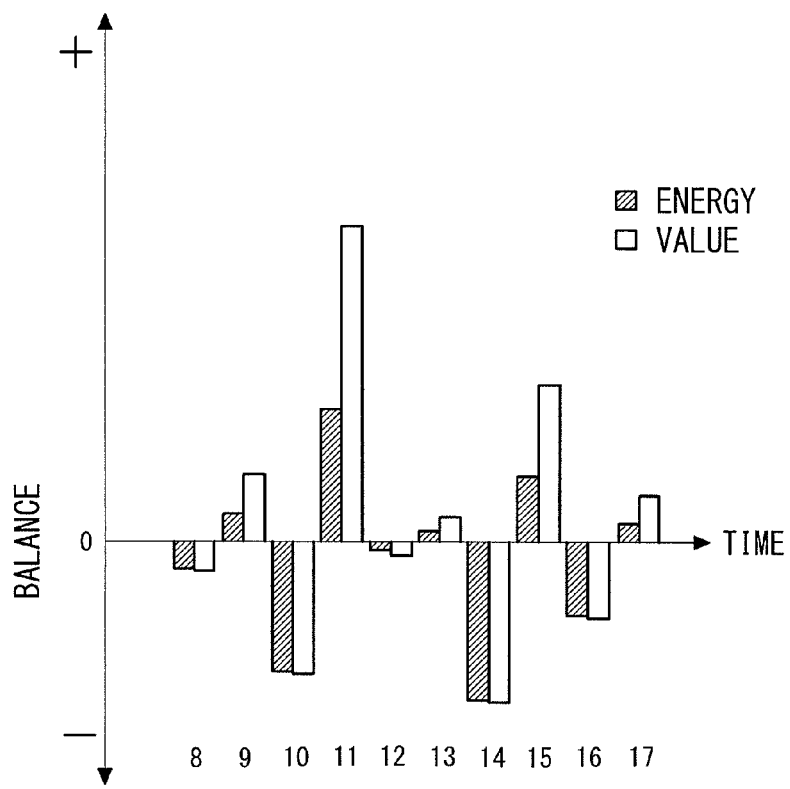
FIG. 11 is a chart showing balance under the condition of FIG. 6 in the second embodiment.

An advantage obtained from the operation in the embodiment is explained with reference to FIGS. 10 and 11. FIGS. 10 and 11 are illustrated in the same way as FIGS. 8 and 9. In FIG. 10, purchasing prices of electricity are shown by a broken line. In the illustrated example, the purchasing prices of electricity are set three steps in one day. That is, the purchasing price of electricity in the night when the photovoltaic power system 30 does not generate electricity is lowest, and the purchasing price of electricity in the daytime from 11:00 to 14:00 (11:00 slot, 12:00 slot and 13:00 slot) is highest. It is assumed that the selling price of electricity is constant. Therefore, in the operation shown in FIG. 10, the difference between the purchasing prices of electricity and the selling price of electricity becomes small from 11:00 to 14:00.

In comparison with FIGS. 8 and 10, the electrical storage device 40 is charged and discharged 5 times each in the operation of FIG. 8 and 4 times each in the operation of FIG. 10, respectively, and it is appreciated that the number of times for charging and discharging the battery 41 is reduced. It is realized from FIG. 9 that returns by selling electricity are reduced by purchasing electricity unless the operation of the electrical storage device 40 is limited, because the purchasing price of electricity is high around the daytime when the generating energy increases. On the other hand, in the embodiment, the operation of the electrical storage device 40 is limited, and it is accordingly possible to selectively stop the operation of the electrical storage device 40 when the returns by selling electricity are low as shown in FIG. 11.

There is a possibility that if the electrical storage device 40 is activated when the difference between the selling price of electricity and the purchasing price of electricity is small, returns are further reduced or losses occur in some cases, because losses occur along with the power conversion of the power conditioner 32. It is therefore desirable that the operation of the electrical storage device 40 should be stopped in time slots having the possibility of low returns. It is accordingly effective to decide whether or not to stop the operation of the electrical storage device 40 in response to unit prices of electricity.

In the embodiment, the battery 41 life caused by charging and discharging thereof is considered and the electrical storage device 40 is activated only in case the increase of returns by selling electricity is predicted, and it is accordingly possible to secure returns and also to prolong the battery (41) life to enhance cost effectiveness. Moreover, it is possible to reduce stress on the battery 41 almost without influence on returns, because the operation of the electrical storage device 40 is stopped when the increase of returns by selling electricity is not predicted. As a result, it is possible to collect investment money for installing the facility including the photovoltaic power system 30 and the electrical storage device 40 for a relatively short time.

In the example of the aforementioned operation, the purchasing prices of electricity are set in three steps in time slots in one day, but the technical concept of the embodiment can be applied to even in the case where the prices are further set in multiple steps. In this case, time slots when the operation of the electrical storage device 40 is stopped may be sequentially chosen from a time slot when purchasing price of electricity is higher. It is assumed that the selling price of electricity is constant, and accordingly the aforementioned operation is substantially performed in case selling price of electricity is high. Even in case selling price of electricity changes, like control has only to be performed in response to the difference between prices. Other configurations and operations are like embodiment 1.

Embodiment 3

As a general rule, embodiment 1 applies the stored energy in the electrical storage device 40 to the demand energy for the electric loads 24 when the excess generating energy is produced, and stores the generating energy of the photovoltaic power system 30 in the electrical storage device 40 when the excess generating energy is not produced. That is, the electrical storage device 40 performing any operation of charging or discharging is decided based on only the excess generating energy.

The present embodiment employs a magnitude correlation between the excess generating energy and a judgment threshold as the condition for choosing any operation of charging or discharging of the electrical storage device 40 in the energy surplus judgment part 103, and is configured to adjust the judgment threshold in response to a remaining capacity of the battery 41.

The operation of embodiment 1 corresponds to setting the judgment threshold to zero. Therefore, in embodiment 1, even if the battery 41 is in full charge (the remaining capacity is equal to or more than the upper limit), the stored energy in the electrical storage device 40 is not applied to the demand energy when the excess generating energy is not produced (the excess generating energy is negative). On the contrary, even if the remaining capacity of the battery 41 is equal to or less than the lower limit, when the excess generating energy is produced (the excess generating energy is positive), the generating energy of the photovoltaic power system 30 is forbidden to be stored in the electrical storage device 40. That is, even if the battery 41 has the stored energy to spare, the stored energy in the battery 41 is forbidden to be used when no excess generating energy is produced, and even if the battery 41 lacks the stored energy, when the excess generating energy is produced, the electrical storage device 40 is not charged.

The cases where the remaining capacity of the battery 41 reaches the upper limit include the case where the excess generating energy is not produced continuously for a long time, and the like. The cases where the remaining capacity of the battery 41 reaches the lower limit include the case where the excess generating energy is produced continuously for a long time, and the like. It is necessary to stop charging the electrical storage device 40 when the remaining capacity of the battery 40 is equal to or more than the upper limit, and to stop discharging the electrical storage device 40 when the remaining capacity of the battery 40 is equal to or less than the lower limit. As a result, balances between purchasing electricity and selling electricity cannot be expected to be improved depending on the remaining capacity of the battery 41.

In condition judgment of the energy surplus judgment part 103 in the embodiment, the generating energy is stored in the electrical storage device 40 when it judges that excess generating energy is equal to or less than the judgment threshold, and the stored energy in the electrical storage device 40 is applied to the demand energy when it judges that the excess generating energy exceeds the judgment threshold. The excess generating energy used for the condition judgment means the difference obtained by subtracting the demand energy from the generating energy. The judgment threshold is decreased (a negative value) when the remaining capacity of the battery 41 is the upper limit or more, and is increased (a positive value) when the remaining capacity of the battery 41 is equal to or less than the lower limit. The judgment threshold is also zero when the remaining capacity of the battery 41 is between the lower limit and the upper limit. The operation when the judgment threshold is zero is similar to that of embodiment 1.

In order to increase the frequency for charging and discharging the electrical storage device 40 to improve returns by selling electricity, the embodiment adopts the technology for changing the judgment threshold as described below. That is, the embodiment is configured to set the judgment threshold to a high threshold so that the frequency for discharging the electrical storage device 40 becomes high when the remaining capacity of the battery 41 is equal to or more than the upper limit, and to set the judgment threshold to a low threshold so that the frequency for charging the electrical storage device 40 becomes high when the remaining capacity of the battery 41 is equal to or less than the lower limit.

An operation of the embodiment that the judgment threshold is set as a variable threshold is explained by using an example that purchasing prices of electricity are set in multiple steps. It is assumed that the purchasing prices of electricity (i.e., unit prices of electric charges) are set in three steps in time slots of one day. The assumed rate structure is that the unit prices of electric charges are set with respect to three time slots of "nighttime" (23:00 to 07:00 of the next day), "daytime" (10:00 to 17:00) and "others" (07:00 to 10:00 and 17:00 to 23:00). It is also assumed that the unit prices of electric charges are JPY 10/kWh in the "nighttime", JPY 30/kWh in the "daytime", and JPY 20/kWh in the "others". On the other hand, selling price of electricity is set to be higher than the unit prices of electric charges in the present circumstances, and is accordingly assumed to be JPY 48/kWh in the same way as embodiment 1.

In the purchasing prices of electricity in the "daytime" and "others" as mentioned above, the purchasing price of electricity in the "daytime" is higher. In this case, it is preferable that charging and discharging should be performed in the time slots of the "others" and in the time slots of the "daytime", respectively in order to increase returns in a normal operation. It is however preferable that the discharging should be performed regardless of the purchasing prices of electricity when the remaining capacity of the battery 41 reaches the upper limit, and the charging should be performed regardless of the purchasing prices of electricity when the remaining capacity of the battery 41 reaches the lower limit. The judgment threshold is varied in order to enable the operation.

In case the power generator 30 is the photovoltaic power system 30 (see FIG. 2), what is needed is to consider the "daytime" and "others", because it can be regarded that the generating energy is not substantially obtained in the "nighttime". In the "daytime" and the "others", the latter has a larger difference with respect to the selling price of electricity. In the aforementioned example, the difference in the "daytime" is JPY 18/kWh, whereas the difference in the "others" is JPY 28/kWh.

As mentioned above, in the configuration provided with the electrical storage device 40, the generating energy of the photovoltaic power system 30 is once charged in the electrical storage device 40, thereby enabling the time shift of time slots when energy is allowed to flow back to the power supply system 21, with respect to time slots when the generating energy is produced. However, the time slots when reverse power flow is allowed are limited to the time slots when the excess generating energy is produced, and energy cannot be made to flow back in the "nighttime".

In the aforementioned rate structure, consumers can obtain large returns if time slots can be time-shifted so that the generating energy in the time slots of the "others" when the purchasing price of electricity from the power supply system 21 is lower is allowed to flow back in the time slots of the "daytime". In short, if the total energy by selling electricity in the "daytime" is assumed to be the same as that in the "others", consumers can obtain larger returns by increasing the ratio of energy by selling electricity in the "daytime" rather than by increasing the ratio of energy by selling electricity in the "others". It is therefore preferable that the residential system should control charging and discharging of the electrical storage device 40 so that the ratio of selling electricity in the "daytime" is increased in comparison with the "others".

As mentioned above, if the remaining capacity of the battery 41 is equal to or more than the upper limit, the frequency of discharging thereof needs to be increased. If the remaining capacity of the battery 41 is equal to or less than the lower limit, the frequency of charging thereof needs to be increased. If the electrical storage device 40 is discharged when the excess generating energy is produced and the remaining capacity of the battery 41 is decreased, the utility energy may increase, thereby causing increase in electricity charges with respect to consumers. In addition, when no excess generating energy is produced, if the electrical storage device 40 is discharged and the remaining capacity of the battery 41 is decreased, energy flowing back may increase, thereby causing increase in returns with respect to consumers.

Increase in electricity charges by increasing the stored energy in the electrical storage device 40 and increase in returns by selling electricity by increasing the energy discharged from the electrical storage device 40 are considered hereinafter.

Figure 12:
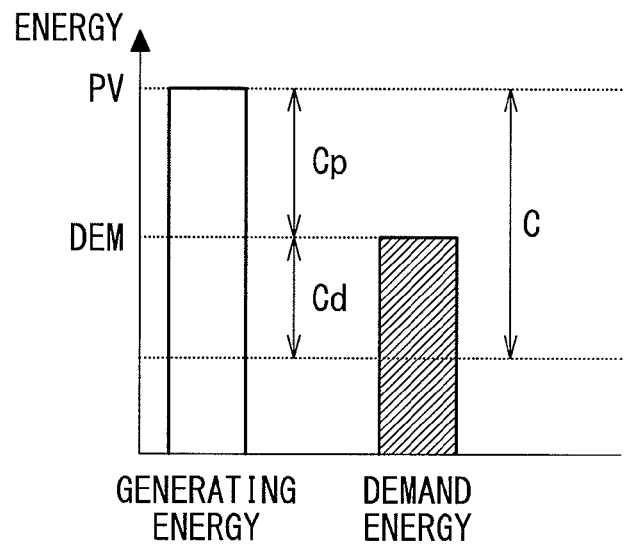
FIG. 12 is an explanatory diagram of an operation in a third embodiment.

As shown in FIG. 12, it is assumed that the generating energy PV is larger than the demand energy DEM and the excess generating energy Cp which is the difference between the generating energy PV and the demand energy DEM is positive. It is also assumed that C is energy which is contained in the generating energy PV and can be stored in the electrical storage device 40, and Cd is energy which is contained in the generating energy PV and obtained by subtracting the excess generating energy Cp from the energy C. That is, the energy Cd is energy which is contained in the generating energy PV and stored in the electrical storage device 40 without being applied to the demand energy DEM, and corresponds to utility energy from the power supply system 21 to be applied to the demand energy DEM. Therefore, the energy of the generating energy PV, applied to the demand energy DEM is PV−C=PV−(Cp+Cd). It is further assumed in the following that S is selling price of electricity by the excess generating energy Cp, and B is purchasing price of electricity from the power supply system 21 in time slots when the excess generating energy is stored in the electrical storage device 40.

If the energy Cd and the excess generating energy Cp within the generating energy PV are stored in the electrical storage device 40, the addition X in electricity charges can be presented by $X=(Cp \times S+Cd \times B)/C$. For example, when C=1 kWh, Cp=0.3 kWh, Cd=0.7 kWh, S=JPY 48/kWh, and B=JPY 20/kWh, X=JPY 28.4/kWh.

It is assumed that in the same time slot, the generating energy PV is stored in the electrical storage device 40 without being applied to the demand energy DEM. In this case, the addition X in electricity charges is $X=\{(PV-DEM) \times S+DEM \times B\}/PV=S+(B-S) \times (DEM/PV)$, where the equations of PV−C=0, Cd=DEM, and Cp=PV−DEM are satisfied.

Figure 13:
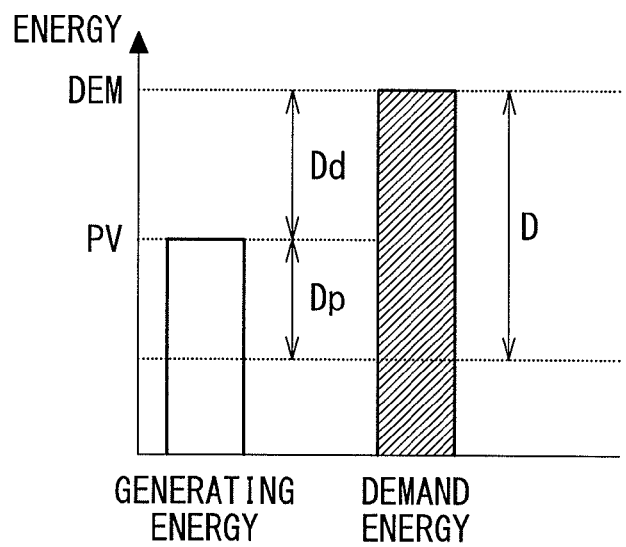
FIG. 13 is an explanatory diagram of an operation thereof.

On the other hand, as shown in FIG. 13, in case the generating energy PV is smaller than the demand energy DEM and the excess generating energy Cp which is the difference between the generating energy PV and the demand energy DEM is negative, the stored energy in the electrical storage device 40 is applied to the demand energy for the electric loads 24. Here, D is the stored energy which can be discharged from the electrical storage device 40, Dd represents a shortage of the generating energy PV with respect to the demand energy DEM, and Dp represents the remaining energy obtained by subtracting the energy Dd from the stored energy D. That is, D=Dp+Dd.

In this operation, not energy from the power supply system 21 but the energy Dd of the stored energy D is applied to the shortage of the generating energy PV with respect to the demand energy DEM. As a result, in the residential system, it is possible to obtain returns corresponding to the charges when the energy Dd is applied from the power supply system 21. The energy Dp of the stored energy D is allocated to the demand energy DEM, and accordingly substantial demand energy as a sum of the demand energy DEM and the stored energy D is DEM−D, which means that the excess generating energy corresponding to PV−Dp is produced with respect to the generating energy PV. That is, in the residential system, the energy corresponding to PV−Dp is allowed to flow back, and thereby returns are obtained.

In addition to the energy Dd which is the shortage of the generating energy PV, the electrical storage device 40 applies the excess stored energy Dp to the demand energy DEM, and then the addition Y in returns by selling electricity can be given by $Y=(Dp \times S+Dd \times B)/D$. For example, when D=1 kWh, Dp=0.7 kWh, Dd=0.3 kWh, S=JPY 48/kWh, and B=JPY 30/kWh, Y=JPY 42.6/kWh.

Here, it is assumed that not energy from the electrical storage device 21 but the stored energy D in the electrical storage device 40 can be applied to the demand energy DEM. In this case, the addition Y in returns by selling electricity is given by $Y=\{PV \times S+(DEM-PV) \times B\}/DEM=B+(S-B) \times (PV/DEM)$, where the equations of DEM−D=0, Dp=PV, and Dd=DEM−PV are satisfied.

As explained above, when the generating energy is larger than the demand energy, the balance between the case where charging is performed without the excess generating energy allowed to flow back and the case where the energy is allowed to flow back results in a loss of JPY X per 1 kWh. On the other hand, when the generating energy is smaller than the demand energy, the balance between the case where the stored energy is applied to the demand energy and the case where the stored energy is not used results in a profit of JPY Y per 1 kWh.

If the electrical storage device 40 is charged with the excess generating energy produced, the electricity charges increase, because the utility energy increases as described above. The addition X per 1 kWh is given by $X=(Cp \times S+Cd \times B)/C$ as described above, and the maximum of the addition is JPY 30/kWh which is the upper limit of the purchasing prices of electricity. Therefore, assuming the energy which can be stored in the electrical storage device 40 is 1 kWh for the purpose of simplicity, $30 \geq Cp \times 48+Cd \times 20$, where S=JPY 48/kWh and B=JPY 20/kWh. Since Cp+Cd=1 and CP=PV−DEM, $PV \leq (10+DEM \times 28)/28 \approx DEM+0.36$ is obtained. It is appreciated from the relation that energy of 1 kWh or more can be stored in the electrical storage device 40 if the generating power PV is smaller than 1.66 kW in case the demand power DEM is 1.3 kW. That is, the judgment threshold can be set to 0.36 in the aforementioned condition.

In order to prolong the battery life, it is desirable that the lower limit and the upper limit of the remaining capacity of the battery 41 should be set to 30% and 80%, respectively in case a lithium-ion battery is employed as the battery 41. What is needed is to change the judgment threshold so that the electrical storage device 40 is preferentially charged when the remaining capacity of the battery 41 is 30% or less, and to change the judgment threshold so that the electrical storage device 40 is preferentially discharged when the remaining capacity is 80% or more. The energy surplus judgment part 103 is also configured to return the judgment threshold to zero if the remaining capacity of the battery 41 is between the upper limit and the lower limit by varying the judgment threshold.

In the aforementioned example, the judgment threshold is set so that the remaining capacity of the battery 41 reaches the lower limit and then the frequency for charging the electrical storage device 40 is increased. In case the remaining capacity of the battery 41 reaches the upper limit and then the frequency for discharging the electrical storage device 40 is increased, the judgment threshold has only to be set as follows. Assuming the selling price of electricity is constant and JPY 48/kWh, it is possible to decide the judgment threshold from the selling price of electricity reduced by about 10% (in this case, JPY 43.2/kWh). That is, the decrement in profit by selling electricity per 1 kWh by charging is given by $Y=(Dp \times S+Dd \times B)/D$, and accordingly becomes $18 PV \geq 18 DEM-4.8$ by using the same condition as that of charging. From the relation, $PV \geq (18 DEM-4.8)/18 \approx DEM-0.27$ is obtained, and accordingly the judgment threshold can be set to −0.27 under the aforementioned condition.

As explained above, by adopting the configuration that the judgment threshold which is compared with the excess generating energy is set and is adjusted in response to whether the remaining capacity of the battery 41 is the upper limit or more or the lower limit or less, the following operation can be performed. That is, the judgment threshold for deciding whether or not to activate the electrical storage device 40 is set to negative when the remaining capacity of the battery 41 is equal to or more than the upper limit. The power generator 30 applies the stored energy to the demand energy until the excess generating energy is equal to or less than the judgment threshold, and accordingly the battery 41 is discharged and the remaining capacity thereof decreases although the excess generating energy is not produced. Here it is desirable to stop discharging the electrical storage device 40 at a point in time when the remaining capacity decreases to a stop threshold set for the remaining capacity of the battery 41 (between the upper limit and the lower limit).

In the aforementioned operation, the stored energy, which is applied to energy from the excess generating energy of zero to the judgment threshold, is energy obtained by storing the generating energy when the remaining capacity of the battery 41 is between the upper limit and the lower limit. That is, the stored energy is obtained by purchasing, from the power supply system 21, the utility energy corresponding to the stored energy in time slots when the battery 41 is charged. Therefore, in place of purchasing the utility energy from the power supply system 21, even if the stored energy is applied to the demand energy, the subtraction is zero, and neither the profit nor the loss occurs.

However, the electrical storage device 40 has an energy loss caused by power conversion, an energy loss caused by self-discharge of the battery 41, and the like, and accordingly such power losses cause the decrease of returns if the electrical storage device 40 is charged or discharged. The judgment threshold is therefore set based on an energy loss caused by the electrical storage device 40 and the returns by selling electricity which are obtained by applying the stored energy in the electrical storage device 40 to the demand energy.

The judgment threshold for deciding whether or not to activate the electrical storage device 40 is set to positive when the remaining capacity of the battery 41 is equal to or less than the lower limit. Even if the excess generating energy is produced, the electrical storage device 40 is charged, because the electrical storage device 40 is charged until the excess generating energy exceeds the judgment threshold. In this case, it is desirable to stop charging the electrical storage device 40 at a point in time when the remaining capacity increases to the stop threshold set for the remaining capacity of the battery 41 (which may be different from the aforementioned stop threshold).

Thus, since the judgment threshold with respect to the excess generating energy is varied in response to the remaining capacity of the battery 41, it is possible to more increase the frequency for charging and discharging the electrical storage device 40 than that of embodiment 1 to largely improve the returns by selling electricity in a short period of time. The battery 41 can be prevented from deteriorating by overcharging or over discharging, because the possibility of overcharging or over discharging of the battery 41 can be suppressed.

Figure 14:
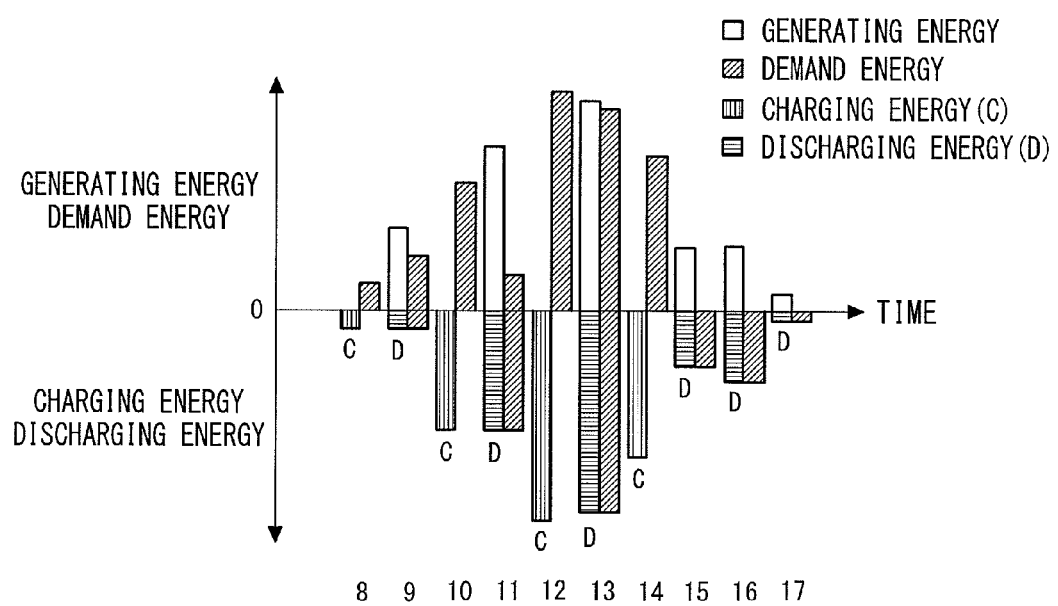
FIG. 14 is a chart showing an operation thereof under the condition of FIG. 6.

According to the operation of the embodiment, it is appreciated from FIG. 14 that the frequency for discharging the electrical storage device 40 to apply the stored energy to the demand energy increases as the remaining capacity of the battery 41 increases from 13:00. FIG. 14 shows the operation of the embodiment under the conditions shown in FIG. 8. In FIG. 14, the charging energy (C) in the 14:00 slot is employed as discharge energy (D) in not only 15:00 slot but also 16:00 slot.

The judgment threshold may be varied in response to time slots or seasons when at least one of selling price of electricity and purchasing price of electricity varies in response to time slots or seasons as described in embodiment 2. Other configurations and operations in the present embodiment are like each of the aforementioned embodiments.

Embodiment 4

It is desirable that the power conditioner 32 shown in FIG. 3 should be provided in order to ensure the application of generating energy to demand energy as described in embodiment 1. The power conditioner 32 shown in FIG. 4 can be however provided as well. That is, even when energy is stored in the electrical storage device 40 from the power supply system 21, if the stored energy is forbidden to flow back thereto, it is possible to apply the stored energy, in the electrical storage device 40 by the utility energy from the power supply system 21, to the demand energy.

The returns by selling electricity are expected to increase by consuming the utility energy from the power supply system 21 to store the energy in the electrical storage device 40, and applying the stored energy to the demand energy in time slots when the generating energy of the photovoltaic power system 30 exceeds the demand energy. In order to increase the returns by selling electricity based on the operation, it is desirable that energy should be stored in the electrical storage device 40 in time slots of the lowest purchasing price of electricity.

In an applicable operation as such an operation, energy is stored in the electrical storage device 40 in time slots of the lowest purchasing price of electricity (midnight in general) so that the battery 41 is charged to the upper limit or more, and the electrical storage device 40 is forbidden to discharge until the generating energy is produced (becomes a suitable threshold or more). In the operation after the generating energy is produced, the electrical storage device 40 has only to be selectively charged and discharged based on the excess generating energy in the same way as each of the aforementioned embodiments.

Not the electrical storage device 40 is selectively charged and discharged based on the excess generating energy just after the generating energy is produced, but the stored energy in the electrical storage device 40 may be applied to the demand energy as much as possible when the demand energy occurs after the generating energy is produced. In this case, what is needed is that the electrical storage device 40 is selectively charged and discharged based on the excess generating energy like each of the aforementioned embodiments after the remaining capacity of the battery 41 decreases to a prescribed value set in advance.

In the operation of the embodiment, utility energy, of which purchasing price is lower than that in the daytime, is applied to the demand energy and consequently the difference between the selling price of electricity and the purchasing price of electricity increases, and the returns by selling electricity is expected to more increase. Other configurations and operations are like each of the aforementioned embodiments.

Since the embodiment stores the utility energy from the power supply system 21 in the electrical storage device 40, the returns by selling electricity can be increased by charging the electrical storage device 40 in time slots of the lowest purchasing price of electricity rather than by charging the electrical storage device 40 in other time slots of higher purchasing price of electricity. The stored energy is to correspond to energy only in time slots of the lowest purchasing price of electricity if the stored energy of the electrical storage device 40 is used up so that the remaining capacity of the battery 41 is equal to or less than the lower limit until a time slot of the lowest purchasing price of electricity starts. That is, the increase in returns by selling electricity is expected by increasing the difference between the selling price of electricity and the purchasing price of electricity. The electrical storage device 40 is not discharged in the state the photovoltaic power system 30 stops generating electricity, and accordingly the remaining capacity of the battery 41 needs to be kept to the lower limit until the generation of electricity by the photovoltaic power system 30 is finished.

In order to enable the operation, the overall operation controller 106 is configured to perform predictions of demand power, generating energy, and a finish time of the generation of electricity by the photovoltaic power system 30, and predict the remaining capacity of the battery 41 until the finish time of the generation of electricity by the photovoltaic power system 30 based on the predictions about the case where any of the operations in the aforementioned embodiments is performed. When the remaining capacity of the battery 41 is higher than the lower limit, the generating energy corresponding to the difference with respect to the lower limit (the loss in the power conditioner 32 is considered) is applied to the demand energy without being applied to charging of the battery 41. According to the operation, the remaining capacity of the battery 41 can be decreased to the lower limit by the finish time of the generation of electricity by the photovoltaic power system 30.

In order to decrease the remaining capacity of the battery 41 to the lower limit by the finish time of the generation of electricity, a threshold for switching the timing of charging and discharging like embodiment 3 may be set so that the discharge duration of the electrical storage device 40 is prolonged. Other configurations and operations are like each of the aforementioned embodiments.

Embodiment 5

In each of the aforementioned embodiments, the operations of a single residential system 20 are described, but the present embodiment provides a technology for reducing the load change seen from a distribution network of the power supply system 21 by associating the operations of residential systems 20 with each other.

Timing of selling electricity and purchasing electricity in each residential system 20 can be adjusted to some extent by using the technology for adjusting the threshold with respect to the excess generating energy to adjust operation timing of charging and discharging the electrical storage device 40 as described in embodiment 3. It is therefore possible to mutually perform energy supply and demand with respect to the residential systems 20 by interlocking the power controllers 10 of the residential systems 20 in a common distribution network. That is, fluctuations in energy flowing back to the power supply system 21 are suppressed. It is not the case where energy supply and demand with respect to the residential systems 20 are balanced, but in all the residential systems 20, the load fluctuations with respect to the power supply system 21 are suppressed.

The configuration for gathering energy information, such as generating energy, demand energy, a remaining capacity of the battery 41, and the like acquired through a power controller 10, for a control system through communication can be utilized for interlocking the power controllers 10 in the residential systems 20. Alternatively, the configuration that each power controller 10 in the residential systems 20 performs distributed processing for mutual adjustment may be adopted. A wide area network such the internet can be utilized for the communication. In order to enable the operation, it is necessary to add a non-illustrated communication function to the power controller 10. Other configurations and operations are similar to each of the aforementioned embodiments.

In each of the embodiments, there is a possibility that a power loss caused by power conversion of the electrical storage device 40 occurs and the power loss causes the increase in electric power consumption in comparison with the case where the electrical storage device 40 is not installed. However, the returns by selling electricity is expected to increase and it is accordingly regarded that power generators of renewable energy (clean energy or green energy) such as the photovoltaic power systems 30 are generalized at an increasing tempo. As a result, the used amounts of fossil fuels in electric power utilities and transmission losses are reduced, and energy-saving of the community as a whole can be expected.

Demand power for the residential system 20 can be managed by interlocking the electrical storage device 40 with the photovoltaic power system 30 even if selling price of electricity is reduced or Feed-in tariff is abolished in future. That is, the electrical storage device 40 is installed in advance in the residential system 20, and accordingly the residential system 20 can respond to changes in the Feed-in tariff without extremely spoiling returns. It is desirable that the operations of the power controller 10 can be comparatively easily changed with respect to such cases. The program for operating the power controller 10 has only to be changed fundamentally.

In each of the embodiments, there is a possibility that the condition for choosing between charging and discharging of the electrical storage device 40 fluctuates in a short time. It is however possible to prevent unstable operation by judging the condition by a relatively long time such as about one hour, like the aforementioned operational example. When choosing between charging and discharging thereof in a relatively short time, after choosing one of them, choosing the other may be forbidden until a prescribed time advances.

With reference to the choice between charging or discharging of the electrical storage device 40, it is assumed that the condition for the excess generating energy (presence or non-presence of the excess generating energy or magnitude correlation with respect to the judgment threshold) does not change until the next choice. It is possible to well choose between charging and discharging of the electrical storage device 40 if the generating energy and the demand energy can be predicted at a point in time of the choice between charging and discharging thereof, because the excess generating energy is decided based on the generating energy and the demand energy.

In the photovoltaic power system 30, the time variation in generating energy can be predicted to some extent by acquiring the information on sunshine such as a weather forecast, because the generating energy is largely influenced by the sunshine. In addition, the demand energy just has to be estimated based on historical data with date and time. It may be also estimated that the past adjacent condition of the excess generating energy still continues after the choice between charging and discharging of the electrical storage device 40.

In the case where the condition of the excess generating energy is judged at prescribed intervals, if it is estimated that the adjacent condition continues, it is considered that a period of judgment coincides with a fluctuation cycle of the demand energy if the demand energy for some electric loads 24 fluctuate periodically. In this case, the control based on a false estimation may continue. What is needed in order to avoid the occurrence of such a problem is to judge presence or non-presence of periodicity of the demand energy in a sufficiently longer time than the period of judgment at a point in time when the condition of the excess generating energy is judged to change the period of judgment so that it does not coincide with the fluctuation cycle of the demand energy.

Although the present invention has been described with reference to certain preferred embodiments, numerous modifications and variations can be made by those skilled in the art without departing from the true spirit and scope of this invention, namely claims.

The invention claimed is:

1. A power controller, provided for a system comprising a power generator and an electrical storage device which are installed in a residential system, the power generator being configured to generate electricity from natural energy and the electrical storage device being configured to charge and discharge a battery, the system being configured to choose a power supply system, the power generator and the electrical storage device to supply energy to an electric load, and also to allow energy from the power generator to flow back to the power supply system, wherein the power controller comprises:
a first energy acquisition part configured to acquire demand energy for the electric load in the residential system;
a second energy acquisition part configured to acquire generating power measured with respect to the power generator;
an energy surplus judgment part configured to perform a conditional judgment about excess generating energy at prescribed intervals, said excess generating energy being a difference between the demand energy acquired through the first energy acquisition part and the generating energy acquired through the second energy acquisition part; and
an overall operation controller configured to choose between charging and discharging of the electrical storage device in response to a result of the conditional judgment through the energy surplus judgment part,
said overall operation controller being configured:
without applying the generating energy of the power generator to the demand energy, to allow it to be stored in the electrical storage device when a first condition is established, said first condition corresponding to a case where the generating energy is equal to or less than the demand energy to which a predetermined judgment threshold is added; and
to apply the stored energy in the electrical storage device to the demand energy for the electric load when a second condition is established, said second condition corresponding to a case where the generating energy exceeds the demand energy to which the judgment threshold is added.

2. A power controller of claim 1, wherein the judgment threshold is zero.

3. A power controller of claim 1, wherein the overall operation controller is configured to apply the generating energy to the demand energy without charging even if the first condition is established in the energy surplus judgment part when a remaining capacity of the battery reaches a specified upper limit.

4. A power controller of claim 1, wherein the overall operation controller is configured to be forbidden to perform charging even if the energy surplus judgment part judges that the first condition is established, in a period of time in which a purchasing price of electricity from the power supply system is equal to or more than a prescribed value in case the number of charging and discharging of the electrical storage device exceeds a specified value in a prescribed period of time.

5. A power controller of claim 1, wherein the overall operation controller is configured to be forbidden to discharge the electrical storage device even if the energy surplus judgment part judges that the second condition is established, in a period of time in which a selling price of electricity flowing back to the power supply system is equal to or more than a prescribed value.

6. A power controller of claim 1, wherein the overall operation controller is configured to allow energy from the power supply system to be stored in the electrical storage device if the first condition is established, in time slots when a purchasing price of electricity from the power supply system is equal to or less than a specified value.

7. A power controller of claim 6, wherein the energy surplus judgment part is configured to set the judgment threshold to a varied threshold.

8. A power controller of claim 7, wherein the energy surplus judgment part is configured:
to set the judgment threshold to a relatively larger threshold in a period of time in which a remaining capacity of the battery is equal to or less than a specified lower limit; and
to set the judgment threshold to a relatively smaller threshold in a period of time in which the remaining capacity of the battery is equal to or more than a specified upper limit.

9. A power controller of claim 7, wherein the energy surplus judgment part is configured:
to set the judgment threshold to a positive threshold in a period of time in which a remaining capacity of the battery is equal to or less than a specified lower limit and the generating energy is larger than the demand energy; and
to set the judgment threshold to zero if the remaining capacity of the battery exceeds the lower limit.

10. A power controller of claim 7, wherein the energy surplus judgment part is configured:
to set the judgment threshold to a negative threshold in a period of time in which a remaining capacity of the battery is equal to or more than a specified upper limit and the demand energy is larger than the generating energy; and
to set the judgment threshold to zero if the remaining capacity of the battery is less than the upper limit.

11. A power controller of claim 6, wherein the overall operation controller is configured to control so that a remaining capacity of the battery is equal to or less than the lower limit until a time slot, when a purchasing price of electricity from the power supply system is equal to or less than a specified value, starts.

12. A power controller of claim 1, further comprising a notification means that gives an advice on suppressing usage of the electric load in a period of time in which the second condition is established in the energy surplus judgment part.

13. A power controller of claim 1, wherein in case the electric load comprises a controller configured to receive a control signal to control electricity consumption thereof, the power controller is configured so that the overall operation controller supplies the control signal for suppressing electricity consumption to the controller of the electric load in a period of time in which the second condition is established in the surplus judgment part.

* * * * *